(12) United States Patent
Somers et al.

(10) Patent No.: US 7,731,857 B2
(45) Date of Patent: Jun. 8, 2010

(54) METHOD FOR TREATING A PROCESS WATER TO OBTAIN CARBON DIOXIDE THEREFROM

(75) Inventors: John M. Somers, Calgary (CA); William L. Strand, Edmonton (CA)

(73) Assignee: Bitmin Resources, Inc., Calgary (CA)

( * ) Notice: Subject to any disclaimer, the term of this patent is extended or adjusted under 35 U.S.C. 154(b) by 681 days.

(21) Appl. No.: 11/552,290

(22) Filed: Oct. 24, 2006

(65) Prior Publication Data
US 2008/0093307 A1    Apr. 24, 2008

(30) Foreign Application Priority Data
Oct. 19, 2006   (CA)   ................................. 2564590

(51) Int. Cl.
   *C02F 1/20* (2006.01)
(52) U.S. Cl. .................. 210/750; 208/391; 210/765; 210/766; 423/438
(58) Field of Classification Search ................. 210/750
   See application file for complete search history.

(56) References Cited

U.S. PATENT DOCUMENTS

| 2,132,607 | A | * | 10/1938 | Davis et al. .................... 516/47 |
| 3,692,634 | A | * | 9/1972 | Othmer ....................... 203/11 |
| 4,414,117 | A | * | 11/1983 | Yong et al. .................. 210/710 |
| 5,085,782 | A | * | 2/1992 | Gallup et al. ................ 210/696 |
| 5,273,661 | A | * | 12/1993 | Pickett et al. ............... 210/710 |
| 5,645,714 | A | * | 7/1997 | Strand et al. ................ 208/391 |
| 5,780,678 | A |   | 7/1998 | Baniel et al. |
| 6,521,365 | B1 | * | 2/2003 | Song ........................... 429/17 |
| 6,667,273 | B1 |   | 12/2003 | Cullen et al. |
| 6,863,819 | B2 |   | 3/2005 | Maree |
| 7,037,434 | B2 | * | 5/2006 | Myers et al. ................. 210/718 |
| 2005/0103323 | A1 | * | 5/2005 | Engdahl .................. 126/355.1 |

FOREIGN PATENT DOCUMENTS

| CA | 1022098 | 12/1977 |
| CA | 2030934 | 5/1992 |
| CA | 2124199 | 6/1992 |
| CA | 2123076 | 11/1998 |
| CA | 2520110 | 9/2005 |
| JP | 10033938 | 2/1998 |
| JP | 11243985 | 9/1999 |

* cited by examiner

*Primary Examiner*—Peter A Hruskoci
(74) *Attorney, Agent, or Firm*—Terrence N. Kuharchuk; Rodman & Rodman

(57) ABSTRACT

A method for treating a process water from a bitumen recovery process in order to obtain carbon dioxide from the process water, which method includes lowering the pH of the process water, thereby causing carbon dioxide to evolve from the process water as evolved carbon dioxide gas. The evolved carbon dioxide gas may be collected and compressed, and water vapour associated with the evolved carbon dioxide gas may be separated from the evolved carbon dioxide gas. After the carbon dioxide has been obtained from the process water, the process water and the water vapour separated from the evolved carbon dioxide gas may be recycled back to the bitumen recovery process. The evolved carbon dioxide gas may be stored for future use or sale. The method may also include heating the process water in order to reduce the solubility of carbon dioxide in the process water.

30 Claims, 1 Drawing Sheet

METHOD FOR TREATING A PROCESS WATER TO OBTAIN CARBON DIOXIDE THEREFROM

TECHNICAL FIELD

A method for treating a process water from a bitumen recovery process in order to obtain carbon dioxide from the process water.

BACKGROUND OF THE INVENTION

Carbon dioxide has a boiling point of −78 degrees Celsius, with the result that carbon dioxide is typically present on earth as a gas. The carbon dioxide molecule includes two oxygen atoms which are attached by double bonds to a single carbon atom. Carbon dioxide is relatively non-reactive and is not flammable.

Carbon dioxide is derived from natural sources such as the oxidation of organic material, fermentation processes and as a product of respiration by aerobic organisms. Carbon dioxide is also derived from man-made sources such as the burning of fossil fuels (i.e., hydrocarbons) and as a by-product of industrial processes. Carbon dioxide is consumed by plants during photosynthesis.

Carbon dioxide is present in the Earth's atmosphere at a low concentration. However, carbon dioxide is the most abundant "greenhouse gas", a group of atmospheric gases which includes carbon dioxide, methane, nitrous oxide and fluorocarbons. It is generally believed that greenhouse gases may contribute to climate change and global warming.

The Kyoto Protocol is an agreement made under the United Nations Framework Convention on Climate Change (UN-FCCC), which agreement entered into force on Feb. 16, 2005. Countries which have ratified the Kyoto Protocol have agreed to control and/or reduce emissions into the atmosphere of carbon dioxide and other greenhouse gases.

Many countries have ratified the Kyoto Protocol, with notable exceptions being the United States and Australia. In any event, there appears to be a general consensus throughout the world that controlling and/or reducing emissions of carbon dioxide and other greenhouse gases is generally desirable.

Carbon dioxide exhibits a relatively high solubility in water. The solubility of carbon dioxide in water does, however, decrease with increasing temperature.

In an aqueous environment carbon dioxide is typically present as dissolved carbon dioxide, as carbonic acid, as bicarbonate ions and as carbonate ions in varying amounts to establish equilibrium as a "carbonate system" or "carbonic acid system", depending upon the concentrations of the various carbon dioxide species and the pH of the aqueous environment. Carbon dioxide typically dissolves and dissociates in water in several steps according to the following formulae:

$$CO_2(gas) \leftrightarrows CO_2(aqueous) \quad (1)$$

$$CO_2(aqueous) + H_2O \leftrightarrows H_2CO_3(aqueous) \quad (2)$$

$$H_2CO_3 \leftrightarrows H^+ + HCO_3^- \quad (3)$$

$$HCO_3^- \leftrightarrows H^+ + CO_3^{2-} \quad (4)$$

As the aqueous environment becomes less acidic and more basic, increasing amounts of carbonic acid ($H_2CO_3$), bicarbonate ion ($HCO_3^-$) and carbonate ion ($CO_3^{2-}$) are formed in a stepwise manner as carbon dioxide dissolves and dissociates in the aqueous environment.

The presence of carbonate ions in an aqueous environment will tend to cause the formation and precipitation of carbonate compounds as carbon dioxide species from cations such as calcium ($Ca^{2+}$) and magnesium ($Mg^{2+}$) which are present in the aqueous environment, according to the following exemplary formulae:

$$CO_3^{2-} + Ca^{2+} \rightarrow CaCO_3 \quad (5)$$

$$CO_3^{2-} + Mg^{2+} \rightarrow MgCO_3 \quad (6)$$

This precipitation of carbonate compounds is reversible to produce carbonate ions as the aqueous environment becomes increasingly acidic, according to the following general formulae:

$$CaCO_3 + 2H^+ \rightarrow Ca^{2+} + CO_3^{2-} \quad (7)$$

$$MgCO_3 + 2H^+ \rightarrow Mg^{2+} + CO_3^{2-} \quad (8)$$

Industrial plants and processes often generate significant amounts of carbon dioxide species, including carbon dioxide, carbonic acid, bicarbonate ions, carbonate ions and carbonate compounds, due to the combustion of fossil fuels and/or as a by-product of the processes being performed.

For example, power plants may generate carbon dioxide species as a result of the combustion of fossil fuels such as coal and oil. Other facilities may generate carbon dioxide species due to the combustion of fossil fuels and as a by-product of the various processes that may occur at such facilities.

Plants and facilities may also generate carbon dioxide species through the use of process water to perform processes, either due to dissolution of carbon dioxide in the process water or due to the presence of cations or carbonate compounds in the process water or in other materials which come into contact with the process water.

For example, the recovery of bitumen from a feed material such as oil sand involves a number of processes which may contribute carbon dioxide species to process water. First, the feed material may contain carbonate compounds which are transferred to the process water during processing of the feed material. Second, air which is used in separation vessels and/or flotation machines may contribute atmospheric carbon dioxide which dissolves in the process water. Third, air exposure at the surface of separation vessels such as thickeners etc. may contribute atmospheric carbon dioxide which dissolves in the process water. Fourth, if combustion gases are used to heat the process water, carbon dioxide contained in the combustion gases may dissolve in the process water.

The loading of carbon dioxide species in process water may ultimately result in undesirable carbon dioxide emissions into the atmosphere, and may also interfere with equipment and with processes that are performed using the process water. These potential problems are exacerbated if the process water is recycled and reused to perform such processes, in which case the amount of carbon dioxide species contained in the process water will typically increase each time the process water is used.

Although carbon dioxide emissions may be undesirable in the context of the general goal of limiting greenhouse gas emissions, carbon dioxide itself is useful for many purposes. Carbon dioxide in solid form (i.e., dry ice) is commonly used as a refrigerant and to carbonate soft drinks. Carbon dioxide is also useful as a non-flammable pressurized gas, as a fire extinguishing compound and as a solvent for organic compounds.

Carbon dioxide is also very useful in connection with hydrocarbon related processes. As one example, carbon dioxide is commonly injected under pressure into oil wells in connection with enhanced oil recovery (EOR) processes, wherein the carbon dioxide both serves to pressurize the producing formation and acts as a solvent for the oil to reduce its viscosity. As a second example, carbon dioxide is often used as a diluent to reduce the viscosity of bitumen to facilitate transportation of the bitumen through pipelines.

As a result, it would be desirable to remove carbon dioxide species from process water which has been used in an industrial process, thereby controlling carbon dioxide emissions which may result from the process water and reducing the loading of carbon dioxide species in the process water. It would also be desirable to collect carbon dioxide obtained from process water so that the carbon dioxide can be used for purposes for which the carbon dioxide may be suited.

SUMMARY OF THE INVENTION

The present invention is a method for treating a process water from an industrial process in order to obtain carbon dioxide from the process water. The method is comprised of lowering the pH of the process water, thereby causing carbon dioxide to evolve from the process water as evolved carbon dioxide gas.

The industrial process may be any process in which process water is used and in which the process water may contain carbon dioxide species which are desired to be removed from the process water.

Carbon dioxide species include carbon dioxide, carbonic acid, bicarbonate ion, carbonate ion, carbonate compounds such as calcium carbonate and magnesium carbonate, and any other chemical entity or molecular particle such as a radical, ion, molecule or atom containing carbon and oxygen which is capable of reacting to produce carbon dioxide.

The industrial process may be a hydrocarbon related process. A hydrocarbon related process is any process performed on or with hydrocarbons in order to recover hydrocarbon bearing feed material from a hydrocarbon bearing deposit, in order to recover hydrocarbons from the feed material, or in order to process hydrocarbons which have been recovered from the feed material.

For example, the hydrocarbon related process may be a bitumen recovery process in which bitumen is recovered from a feed material. As used herein, "bitumen" includes any substance which consists primarily of hydrocarbons, such as crude oil, heavy oil, asphalt, and the hydrocarbon material typically contained in oil sand or oil shale deposits. As used herein, a "bitumen recovery process" includes any process by which bitumen is recovered or separated from a material which contains bitumen and non-hydrocarbon material such as mineral matter, water etc.

In preferred embodiments the industrial process is a hydrocarbon related process, which in turn is a bitumen recovery process, which in turn is a process for recovering bitumen from a material which contains bitumen and non-hydrocarbon material. In a particular preferred embodiment the material from which the bitumen is recovered is an oil sand feed material from which bitumen can be recovered using water based processes which involve preparing an aqueous slurry of oil sand feed material and process water.

In one aspect the invention is a method for treating a process water from a bitumen recovery process in order to obtain carbon dioxide from the process water, the method comprising lowering the pH of the process water, thereby causing carbon dioxide to evolve from the process water as evolved carbon dioxide gas.

The method may be further comprised of collecting the evolved carbon dioxide gas. Additionally or alternatively, the method may be further comprised of compressing the evolved carbon dioxide gas. Additionally or alternatively, the method may be further comprised of storing the evolved carbon dioxide gas. Additionally or alternatively, the method may be further comprised of recycling the process water back to the industrial process after the carbon dioxide has been obtained therefrom.

A water vapour may be associated with the evolved carbon dioxide gas, in which case the method may additionally or alternatively be further comprised of separating the water vapour from the evolved carbon dioxide gas.

The water vapour may be separated from the evolved carbon dioxide gas in any suitable manner. In a preferred embodiment, separating the water vapour from the evolved carbon dioxide gas is comprised of cooling the evolved carbon dioxide gas so that the water vapour is condensed, thereby producing dewatered carbon dioxide gas and condensed water vapour from the evolved carbon dioxide gas.

The condensed water vapour may be collected, following which the condensed water vapour may be disposed of or may be recycled back to the industrial process.

In a preferred embodiment, the evolved carbon dioxide gas is collected as collected carbon dioxide gas. By collecting the evolved carbon dioxide gas the evolved carbon dioxide gas is prevented from being emitted into the atmosphere. The collected carbon dioxide gas is then compressed to produce compressed carbon dioxide gas. The compressed carbon dioxide gas is then cooled in order to condense the water vapour which is associated with the compressed carbon dioxide gas, thereby producing dewatered carbon dioxide gas and condensed water vapour from the compressed carbon dioxide gas. The condensed water vapour is then collected and recycled back to the industrial process. Meanwhile, the process water is recycled back to the industrial process and the dewatered carbon dioxide gas is stored.

The stored dewatered carbon dioxide gas may be sold and/or used for many different purposes. As one example, the dewatered carbon dioxide gas may be used as an injection fluid in connection with enhanced oil recovery (EOR) processes. As a second example, the dewatered carbon dioxide gas may be used as a hydrocarbon diluent to facilitate the pipeline transport of bitumen.

Any adjustment of the pH of the process water will cause a shift in the equilibrium of the carbonate system of the process water (comprising dissolved carbon dioxide ($CO_2$), carbonic acid ($H_2CO_3$), bicarbonate ions ($HCO_3^-$) and carbonate ions ($CO_3^{2-}$)) and will thereby affect the overall solubility of carbon dioxide in the process water.

For example, in a closed carbonate system, carbonic acid will typically be present in the process water only if the pH of the process water is less than about 8, bicarbonate ions will typically be present in the process water only if the pH of the process water is between about 4 and about 13, and carbonate ions will typically be present in the process water only if the pH of the process water is above about 8.

If the pH of the process water is below about 6.5, then typically between 50 percent and 100 percent of the carbon dioxide species in the process water will be comprised of carbonic acid. If the pH of the process water is between about 6.5 and about 10.5, then typically between 50 percent and 100 percent of the carbon dioxide species in the process water will be comprised of bicarbonate ions. If the pH of the process water is above about 10.5, then typically between 50 percent and 100 percent of the carbon dioxide species in the process water will be comprised of carbonate ions.

In the practice of the invention, the goal in lowering the pH of the process water is to shift the equilibrium of the carbonate system of the process water toward favouring carbonic acid as the carbon dioxide species, which shift in equilibrium will result in a tendency for carbon dioxide to evolve from the process water as carbon dioxide gas.

As a result, in the practice of the invention the pH of the process water is preferably lowered to less than about 8 so that carbonate ions in the process water are virtually eliminated. More preferably the pH of the process water is lowered to less than about 6.5 so that carbonic acid is the dominant carbon dioxide species in the process water.

The pH of the process water may be lowered in any suitable manner. For example, the pH of the process water may be lowered by adding to the process water one or more substances which are not acids but which will result in acidification of the process water due to dissociation and/or chemical reactions when combined with the process water.

Alternatively, and preferably, the pH of the process water may be lowered by adding one or more acids to the process water. The acid may be comprised of any acid which is compatible with the industrial process being performed with the process water. In preferred embodiments where the industrial process is a bitumen recovery process, the acid is preferably comprised of sulphuric acid.

A change in temperature of the process water will also affect the overall solubility of carbon dioxide in the process water. Specifically, the solubility of carbon dioxide in the process water will decrease as the process water is heated and the temperature of the process water increases.

As a result, the method may be further comprised of heating the process water in order to decrease the solubility of the carbon dioxide in the process water and thereby increase the amount of carbon dioxide which is evolved from the process water as evolved carbon dioxide gas. The process water may be heated in any suitable manner.

In a preferred embodiment, the process water may be heated using one or more submerged combustion heaters, in which heat transfer to the process water is effected from hot combustion gas which is discharged into the process water. Where submerged combustion heaters are used to heat the process water, the combustion gas is preferably collected after it passes through the process water.

The collected combustion gas may be compressed. Additionally or alternatively, a combustion gas water vapour may be associated with the collected combustion gas and the combustion gas water vapour may be separated from the collected combustion gas.

The combustion gas water vapour may be separated from the collected combustion gas in any suitable manner. For example, separating the combustion gas water vapour from the collected combustion gas may be comprised of cooling the collected combustion gas so that the combustion gas water vapour is condensed, thereby producing a dewatered combustion gas and a condensed combustion gas water vapour from the collected combustion gas.

In preferred embodiments, the collected combustion gas is compressed to produce a compressed combustion gas and the compressed combustion gas is cooled so that a combustion gas water vapour associated with the compressed combustion gas is condensed, thereby producing a dewatered combustion gas and a condensed combustion gas water vapour.

The condensed combustion gas water vapour may be collected, following which the condensed combustion gas water vapour may be disposed of or may be recycled back to the industrial process.

The collected combustion gas, the compressed combustion gas and/or the dewatered combustion gas may be stored, following which it may be sold and/or used. For example, combustion gas is often used as a non-combustible or inert gas in processes which require a non-combustible and/or non-explosive environment.

BRIEF DESCRIPTION OF DRAWINGS

Embodiments of the invention will now be described with reference to the accompanying drawings, in which.

DETAILED DESCRIPTION

Figure 1:
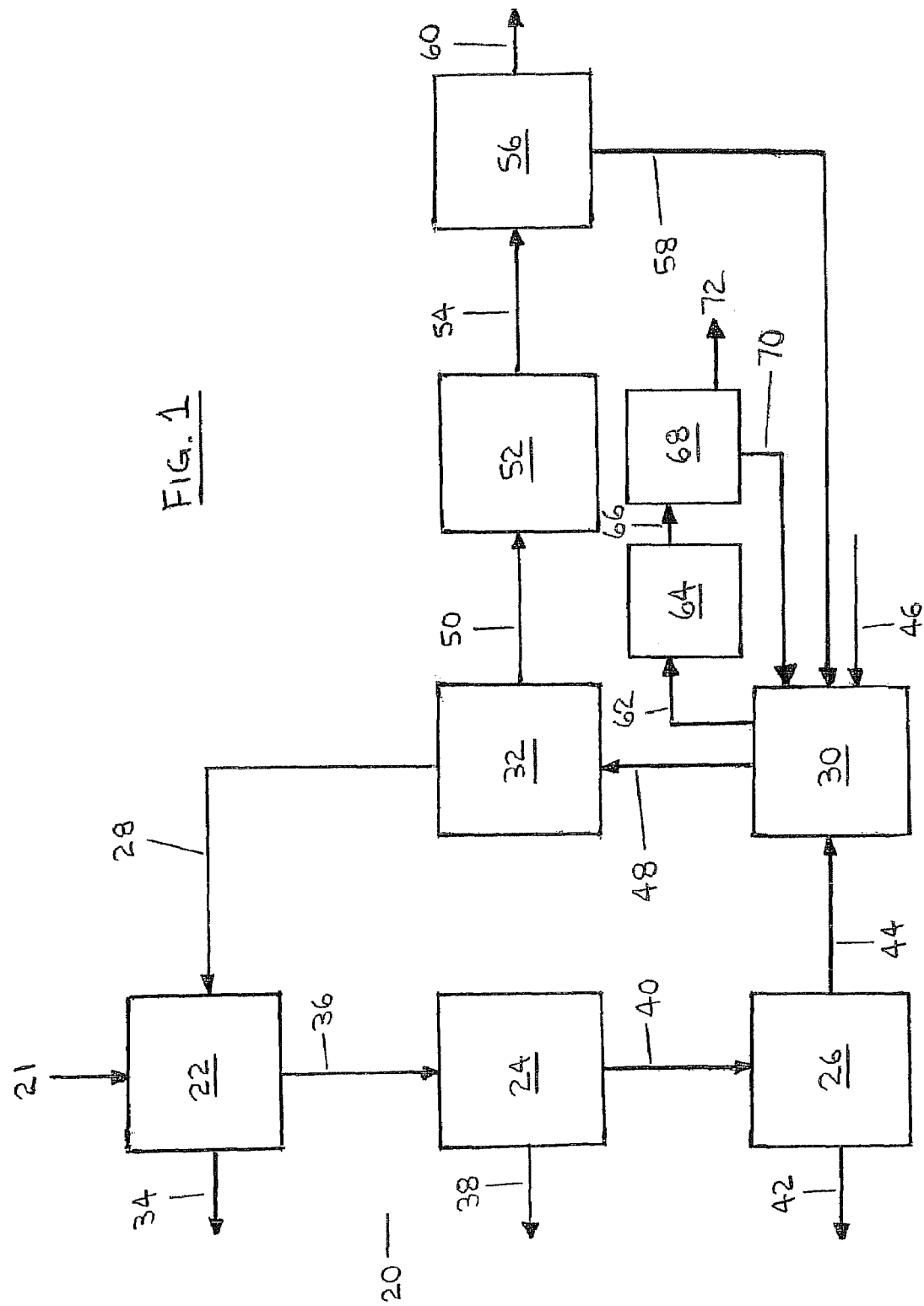
FIG. 1 is a process flow diagram depicting a preferred embodiment of the method of the invention in which carbon dioxide is obtained from process water used in a bitumen recovery process, wherein the bitumen recovery process is a process for recovering bitumen from oil sand.

Referring to FIG. 1, there is depicted a process flow diagram for a preferred embodiment of the method of the invention in which the method is used in conjunction with a bitumen recovery process. The application of the invention is not limited to use in conjunction with bitumen recovery processes. The invention may be used in conjunction with any industrial process in circumstances where it is desirable to remove carbon dioxide species from process water.

The process flow diagram of FIG. 1 includes a simplified process flow diagram for a bitumen recovery process (20). Specifically, the simplified process flow diagram depicts a process for recovering bitumen from oil sand. The simplified process flow diagram is exemplary only for the purpose of demonstrating how the invention may be used in conjunction with a bitumen recovery process (20), and is not intended to limit the application of the invention to any particular type of bitumen recovery process (20). For example, the bitumen recovery process (20) may be the Clark hot water process for recovering bitumen from oil sand, or may be any other process for recovering bitumen from oil sand or some other feed material which involves mixing the feed material with a process water. In preferred embodiments, the bitumen recovery process (20) is similar to the process described in Canadian Patent No. 2,123,076 (Strand et al).

As depicted in simplified form in FIG. 1, the bitumen recovery process (20) includes three distinct steps.

The first step is a solids rejection step, which is performed in a solids rejection system (22). The solids rejection system (22) may be comprised of one or more primary separation vessels as used in the Clark hot water process, rotating drums as described in Canadian Patent No. 2,123,076 (Strand et al), hydrocyclones, centrifuges, or any other separation equipment or apparatus which is suitable for use in the solids rejection system (22).

The second step is a bitumen froth treatment step, which is performed in a bitumen froth treatment system (24). The bitumen froth treatment system (24) may be comprised of one or more inclined plate separators, hydrocyclones, flotation apparatus or any other separation equipment or apparatus which is suitable for use in the bitumen froth treatment system (24).

The third step is a fine tailings thickening step, which is performed in a fine tailings thickener (26). The fine tailings thickener (26) may be comprised of one or more gravity separation vessels, hydrocyclones, centrifuges or any other equipment or apparatus which is suitable for use as the fine tailings thickener (26).

In the bitumen recovery process (20), an oil sand feed material (21) is first mined and prepared (not shown). Preparation of the oil sand feed material (21) involves crushing the material to a size which is compatible with the solids rejection system (22). The oil sand feed material (21) is essentially a matrix of bitumen, relatively coarse mineral matter such as rock and sand, relatively fine mineral matter such as silt and clay, and water.

In the solids rejection step, the oil sand feed material (21) is delivered to the solids rejection system (22), where it is combined with heated process water via a process water delivery line (28) to form an aqueous slurry. The process water is heated using a process water heater (30), following which the heated process water is delivered to a surge tank (32). The process water delivery line (28) extends from the surge tank (32) to the solids rejection system (22).

The temperature of the process water when it is delivered to the solids rejection system (22) depends upon the particular bitumen recovery process (20) which is being practiced. In the preferred embodiments where the bitumen recovery process (20) is a process for recovering bitumen from oil sand, the temperature of the process water when it is delivered to the solids rejection system (22) may typically vary from between about 50 degrees Celsius and about 95 degrees Celsius.

The process water heater (30) may be comprised of one or more structures, devices or apparatus which are suitable for heating the process water. In preferred embodiments of the invention, the process water heater (30) is comprised of one or more submerged combustion heaters (not shown), which effect heat transfer to the process water from the hot combustion gas which is discharged into the hot water by the submerged combustion heaters.

In the solids rejection step, the oil sand feed material (21) is separated into a solid tailings stream (34) and a bitumen froth stream (36). The solid tailings stream (34) contains most of the relatively coarse mineral matter which is contained in the oil sand feed material (21), together with a very small amount of bitumen, a small amount of the relatively fine mineral matter, and an amount of water. The bitumen froth stream (36) contains most of the bitumen which is contained in the oil sand feed material (21), together with an amount of the relatively fine mineral matter and an amount of water.

In some bitumen recovery processes (20), the oil sand feed material (21) may also be separated into a middlings stream (not shown), which contains a small amount of bitumen, a small amount of the relatively fine mineral matter, and water.

The solid tailings stream (34) is typically disposed of without further processing. The middlings stream, where present, is typically processed in a secondary recovery process in order to recover a secondary bitumen froth stream (not shown) and a middlings tailings stream (not shown). The bitumen froth stream (36) is sent to the bitumen froth treatment system (24) for treatment in the bitumen froth treatment step.

In the bitumen froth treatment step, the bitumen froth stream is delivered to the bitumen froth treatment system (24) where the bitumen froth stream is separated into a cleaned bitumen froth stream (38) and a fine tailings stream (40). The bitumen froth treatment step will typically involve the addition of one or more hydrocarbon solvents or diluents to the bitumen froth stream (36) to assist in the performance of the bitumen froth treatment step.

The cleaned bitumen froth stream (38) represents the bitumen product which is obtained from the bitumen recovery process (20), and is typically sent to an upgrading facility (not shown) for upgrading into a synthetic crude oil.

The fine tailings stream (40) is sent to the fine tailings thickener (26) for treatment in the fine tailings thickening step, where the fine tailings stream (40) is separated into a thickened fine tailings stream (42) and a recovered process water stream (44). A flocculent may be added to the fine tailings stream (40) to assist in the formation of the thickened fine tailings stream (42).

The thickened fine tailings stream (42) is typically disposed of in a landfill (not shown) or in a tailings pond (not shown), depending upon the water content of the thickened fine tailings stream (42). All or a portion of the thickened fine tailings stream (42) may alternatively be combined with the solid tailings stream (34) in order to produce a combined tailings stream (not shown), which may be a non-segregating tailings stream as taught by Canadian Patent No. 2,123,076 (Strand et al).

In preferred embodiments, the recovered process water stream (44) is returned to the surge tank (32) via the process water heater (30) so that it can be reheated and recycled back to the bitumen recovery process (20).

In most bitumen recovery processes (20), an amount of the process water will be lost to the solid tailings stream (34), the cleaned bitumen froth stream (38), the thickened fine tailings stream (42), or to evaporation or vaporization during the bitumen recovery process (20). As a result, the process water which is delivered to the solids rejection system (22) via the process water delivery line (28) is comprised of the recovered process water stream (44) and may be further comprised of a make-up water stream (46).

The process water upon which the present invention is practiced may be comprised of the recovered process water stream (44) and/or the make-up water stream (46). Preferably the process water upon which the present invention is practiced is either the recovered process water stream (44) or includes both the recovered process water stream (44) and the make-up water stream (46).

The make-up water stream (46) may contain amounts of carbon dioxide species due to dissolution of atmospheric carbon dioxide gas or due to the presence of carbonate compounds in the make-up water stream (46).

The recovered process water stream (44) will typically contain additional amounts of carbon dioxide species, either as by-products of the bitumen recovery process (20) or as a consequence of the bitumen recovery process (20).

As a first example, the oil sand feed material (21) will typically contain carbonate compounds such as calcium carbonate and magnesium carbonate, which carbonate compounds may be transferred to the process water during the solids rejection step. As a second example, air which is used during the bitumen froth treatment step in connection with froth flotation processes or air which comes into contact with the bitumen froth stream in separation vessels will contain carbon dioxide gas which may become dissolved in the process water. As a third example, air exposure at the surface of the fine tailings thickener (26) during the fine tailings thickening step will contain carbon dioxide gas which may become dissolved in the process water. As a fourth example, the combustion gases which effect heat transfer to the process water in the process water heater (30) will contain significant amounts of carbon dioxide species which may become dissolved or may be transferred to the process water during heating of the process water.

The process water will therefore typically contain relatively high amounts of carbon dioxide species and will typically exhibit a relatively high pH due to the presence of the carbon dioxide species therein, most particularly carbonate and bicarbonate ions.

By lowering the pH of the process water, thereby shifting the equilibrium of the carbonate system in the process water away from carbonate ions and bicarbonate ions and toward carbonic acid and dissolved carbon dioxide gas, carbon dioxide gas can be made to evolve from the process water. By collecting the evolved carbon dioxide gas, the carbon dioxide can be prevented from contributing undesired greenhouse gas emissions into the atmosphere and can be made available for various uses for which carbon dioxide gas is suited.

In preferred embodiments, lowering of the pH of the process water is achieved by adding one or more acids to the process water at an acid addition station (48). Preferably the acid addition station (48) is located either upstream of the surge tank (32) or at the surge tank (32).

The acid addition station (48) may be located either upstream or downstream of the process water heater (30). Preferably the acid addition station (48) is located downstream of the process water heater (30) and preferably the recovered process water stream (44) and the make-up water stream (46) are both heated by the process water heater (30) so that the process water upon which the invention is practiced is comprised of heated process water. This configuration avoids the presence of large amounts of acid in the process water heater (30).

Alternatively or additionally, the surge tank (32) may be provided with a heater (not shown) or a water heater (not shown) separate from both the process water heater (30) and the surge tank (32) may be provided in order to heat the process water downstream of the acid addition station (48).

In any event, since the solubility of carbon dioxide in water decreases as the temperature of the water increases, heating the process water, in the process water heater (30) and/or in some other heater assists in the method of the invention by reducing the solubility of carbon dioxide in the process water.

In preferred embodiments a preferred acid is sulphuric acid. Although any reduction in pH of the process water is within the scope of the invention, in preferred embodiments a sufficient amount of sulphuric acid is added to the process water at the acid addition station (48) to cause the pH of the process water to be lowered to less than about 8, and more preferably to less than about 6.5.

The pH of the process water is monitored at the surge tank (32), and the addition of the acid at the acid addition station (48) may be controlled using an appropriate controller and control loop, with the desired pH of the process water as a setpoint.

In preferred embodiments, the surge tank (32) is substantially sealed so that carbon dioxide gas which evolves from the process water may be collected in the surge tank (32) as collected carbon dioxide gas, thereby preventing the evolved carbon dioxide gas from being emitted into the atmosphere.

Once collected in the surge tank (32) or in some other manner, the collected carbon dioxide gas is sent as a collected carbon dioxide gas stream (50) to a compressor (52), where compressed carbon dioxide gas is produced from the collected carbon dioxide gas. The compressed carbon dioxide gas is then sent as a compressed carbon dioxide gas stream (54) to a cooler (56) where the compressed carbon dioxide gas is cooled. As a result of the cooling of the compressed carbon dioxide gas, water vapour which is associated with the compressed carbon dioxide gas is condensed, thereby separating the water vapour from the compressed carbon dioxide gas to produce a condensed water vapour stream (58) and a dewatered carbon dioxide gas stream (60).

The condensed water vapour stream (58) is recycled back to the bitumen recovery process (20), effectively as a component of the recovered process water stream (44). In the preferred embodiments the condensed water vapour stream (58) is returned to the process water heater (30) so that the condensed water vapour stream (58) can be heated before it is recycled back to the bitumen recovery process (20) and so that it can be heated upstream of the acid addition station (48).

The dewatered carbon dioxide gas stream (60) may be sent to a storage facility (not shown) where it may be stored for future use or sale, or alternatively the dewatered carbon dioxide gas stream (60) may be sent directly from the cooler (56) for immediate use or sale.

In the preferred embodiments where the process water heater (30) is comprised of one or more submerged combustion heaters, combustion gas from the submerged combustion heaters is preferably collected after it passes through the process water and is sent as a collected combustion gas stream (62) to a combustion gas compressor (64).

In the combustion gas compressor (64), the collected combustion gas is compressed to produce compressed combustion gas. The compressed combustion gas is sent as a compressed combustion gas stream (66) to a combustion gas cooler (68) where the compressed combustion gas is cooled. As a result of the cooling of the compressed combustion gas, a combustion gas water vapour associated with the combustion gas is condensed, thereby separating the combustion gas water vapour from the compressed combustion gas to produce a condensed combustion gas water vapour stream (70) and a dewatered combustion gas (72).

In the preferred embodiments, the condensed combustion gas water vapour stream (70) is recycled back to the bitumen recovery process (20), in a similar manner as is the condensed water vapour stream (58).

The dewatered combustion gas stream (72) may be sent to a storage facility (not shown) where it may be stored for future use or sale, or alternatively the dewatered combustion gas stream (72) may be sent directly from the combustion gas cooler (68) for immediate use or sale. The dewatered combustion gas stream (72) may, for example, be used as a non-combustible or inert gas in connection with the bitumen froth treatment step or in connection with some other operation within the bitumen recovery process (20).

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A method for treating a process water from a bitumen recovery process in order to obtain carbon dioxide from the process water, containing a carbonate system the method comprising lowering the pH of the process water to less than about 8, thereby causing a shift in equilibrium from the carbonate system toward carbonic acid, and carbon dioxide to evolve from the process water as evolved carbon dioxide gas, and further comprising collecting the evolved carbon dioxide gas as a collected carbon dioxide gas.

2. The method as claimed in claim 1 wherein a water vapour is associated with the evolved carbon dioxide gas, further comprising separating the water vapour from the evolved carbon dioxide gas.

3. The method as claimed in claim 2 wherein separating the water vapour from the evolved carbon dioxide gas is comprised of cooling the evolved carbon dioxide gas so that the water vapour is condensed, thereby producing a dewatered carbon dioxide gas and a condensed water vapour from the evolved carbon dioxide gas.

4. The method as claimed in claim 3, further comprising collecting the condensed water vapour.

5. The method as claimed in claim 4, further comprising recycling the condensed water vapour back to the bitumen recovery process.

6. The method as claimed in claim 1, further comprising storing the evolved carbon dioxide gas.

7. The method as claimed in claim 1, further comprising recycling the process water back to the bitumen recovery process after the carbon dioxide has been obtained therefrom.

8. The method as claimed in claim 1, further comprising compressing the collected carbon dioxide gas in order to produce a compressed carbon dioxide gas.

9. The method as claimed in claim 8 wherein a water vapour is associated with the compressed carbon dioxide gas, further comprising separating the water vapour from the compressed carbon dioxide gas in order to produce a dewatered carbon dioxide gas.

10. The method as claimed in claim 9, further comprising storing the dewatered carbon dioxide gas.

11. The method as claimed in claim 10, further comprising recycling the process water back to the bitumen recovery process after the carbon dioxide has been obtained therefrom.

12. The method as claimed in claim 11 wherein lowering the pH of the process water is comprised of adding an acid to the process water.

13. The method as claimed in claim 12 wherein the acid is comprised of sulphuric acid.

14. The method as claimed in claim 11, further comprising heating the process water in order to reduce the solubility of carbon dioxide in the process water.

15. The method as claimed in claim 14 wherein heating the process water is performed using at least one submerged combustion heater.

16. The method as claimed in claim 15 wherein the submerged combustion heater provides a combustion gas for effecting heat transfer to the process water, further comprising collecting the combustion gas after it has passed through the process water as a collected combustion gas.

17. The method as claimed in claim 16, further comprising compressing the collected combustion gas to produce a compressed combustion gas.

18. The method as claimed in claim 17 wherein a combustion gas water vapour is associated with the compressed combustion gas, further comprising separating the combustion gas water vapour from the compressed combustion gas in order to produce a dewatered combustion gas.

19. The method as claimed in claim 18 wherein separating the combustion gas water vapour from the compressed combustion gas is comprised of cooling the compressed combustion gas so that the combustion gas water vapour is condensed, thereby producing the dewatered combustion gas and a condensed combustion gas water vapour from the compressed combustion gas.

20. The method as claimed in claim 19, further comprising collecting the condensed combustion gas water vapour.

21. The method as claimed in claim 20, further comprising recycling the condensed combustion gas water vapour back to the bitumen recovery process.

22. The method as claimed in claim 19, further comprising storing the dewatered combustion gas.

23. The method as claimed in claim 16 wherein a combustion gas water vapour is associated with the collected combustion gas, further comprising separating the combustion gas water vapour from the collected combustion gas.

24. The method as claimed in claim 23 wherein separating the combustion gas water vapour from the collected combustion gas is comprised of cooling the collected combustion gas so that the combustion gas water vapour is condensed, thereby producing a dewatered combustion gas and a condensed combustion gas water vapour from the collected combustion gas.

25. The method as claimed in claim 24, further comprising collecting the condensed combustion gas water vapour.

26. The method as claimed in claim 25, further comprising recycling the condensed combustion gas water vapour back to the bitumen recovery process.

27. The method as claimed in claim 16, further comprising storing the collected combustion gas.

28. The method as claimed in claim 11 wherein separating the water vapour from the compressed carbon dioxide gas is comprised of cooling the compressed carbon dioxide gas so that the water vapour is condensed, thereby producing the dewatered carbon dioxide gas and a condensed water vapour from the compressed carbon dioxide gas.

29. The method as claimed in claim 28, further comprising collecting the condensed water vapour.

30. The method as claimed in claim 29, further comprising recycling the condensed water vapour back to the bitumen recovery process.

* * * * *